US012652459B2

(12) United States Patent
Xue

(10) Patent No.: US 12,652,459 B2
(45) Date of Patent: Jun. 9, 2026

(54) SHOOTING METHOD, APPARATUS, AND ELECTRONIC DEVICE

(71) Applicant: VIVO MOBILE COMMUNICATION CO., LTD., Guangdong (CN)

(72) Inventor: Fang Xue, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 42 days.

(21) Appl. No.: 18/785,100

(22) Filed: Jul. 26, 2024

(65) Prior Publication Data

US 2024/0388790 A1     Nov. 21, 2024

Related U.S. Application Data

(63) Continuation of application No. PCT/CN2023/073594, filed on Jan. 28, 2023.

(30) Foreign Application Priority Data

Jan. 28, 2022    (CN) .......................... 202210104792.1

(51) Int. Cl.
H04N 23/63        (2023.01)
H04N 23/62        (2023.01)

(52) U.S. Cl.
CPC ........... H04N 23/632 (2023.01); H04N 23/62 (2023.01); H04N 23/633 (2023.01)

(58) Field of Classification Search
CPC .... H04N 23/62; H04N 23/631; H04N 23/632; H04N 23/633; H04N 23/64
See application file for complete search history.

(56) References Cited

U.S. PATENT DOCUMENTS

| | | | |
|---|---|---|---|
| 12,464,217 B2 * | 11/2025 | Liu ...................... | H04N 23/633 |
| 2005/0007468 A1 * | 1/2005 | Stavely .................. | H04N 23/64 |
| | | | 348/E5.047 |
| 2017/0064205 A1 * | 3/2017 | Choi ..................... | H04W 4/023 |
| 2018/0034979 A1 | 2/2018 | Aggarwal et al. | |
| 2018/0097990 A1 | 4/2018 | Jayaraj et al. | |
| 2020/0351353 A1 | 11/2020 | Al Majid et al. | |
| 2022/0321795 A1 * | 10/2022 | Jiang .................... | H04N 23/531 |
| 2024/0031668 A1 | 1/2024 | Zhang et al. | |
| 2024/0089586 A1 | 3/2024 | Zhang et al. | |
| 2024/0196082 A1 | 6/2024 | Wang | |

FOREIGN PATENT DOCUMENTS

| | | |
|---|---|---|
| CN | 105872361 A | 8/2016 |
| CN | 108668083 A | 10/2018 |
| CN | 109495684 A | 3/2019 |
| CN | 109788204 A | 5/2019 |

(Continued)

*Primary Examiner* — Amy R Hsu
(74) *Attorney, Agent, or Firm* — Price Heneveld LLP

(57)        ABSTRACT

This application discloses a shooting method, an apparatus, and an electronic device, and pertains to the technical field of electronic products. The shooting method includes: receiving a first input to a first template image; displaying a shooting preview screen in response to the first input; and in a case that a second input is received, performing a shooting operation on an image in the shooting preview screen based on a first shooting parameter to obtain a shot image, where the first shooting parameter is a shooting parameter of the first template image.

18 Claims, 8 Drawing Sheets

(56) References Cited

FOREIGN PATENT DOCUMENTS

| | | | |
|---|---|---|---|
| CN | 110401766 | A | 11/2019 |
| CN | 110891144 | A | 3/2020 |
| CN | 113093968 | A | 7/2021 |
| CN | 113473017 | A | 10/2021 |
| CN | 113794834 | A | 12/2021 |
| CN | 113824883 | A | 12/2021 |
| CN | 114500844 | A | 5/2022 |
| JP | 2002290778 | A | 10/2002 |
| WO | 2018086262 | A1 | 5/2018 |
| WO | 2021104236 | A1 | 6/2021 |
| WO | 2021121253 | A1 | 6/2021 |

* cited by examiner

SHOOTING METHOD, APPARATUS, AND ELECTRONIC DEVICE

CROSS-REFERENCE TO RELATED APPLICATIONS

This application is a Bypass Continuation Application of PCT International Application No. PCT/CN2023/073594 filed on Jan. 28, 2023, which claims priority to Chinese Patent Application No. 202210104792.1, filed in China on Jan. 28, 2022, which are incorporated herein by reference in their entireties.

TECHNICAL FIELD

This application relates to the technical field of electronic products and specifically to a shooting method, an apparatus, and an electronic device.

BACKGROUND

In the prior art, users typically need to manually adjust shooting parameters to improve the shooting effect when shooting using electronic devices. However, for many users, due to reasons such as a lack of understanding of the effects of various shooting parameters, they usually need to spend a long time repeatedly adjusting these parameters. It can be seen that existing shooting methods have the problems of cumbersome shooting process and low shooting efficiency.

SUMMARY

According to a first aspect, an embodiment of this application provides a shooting method including:

receiving a first input to a first template image;

displaying a shooting preview screen in response to the first input; and in a case that a second input is received, performing a shooting operation on an image in the shooting preview screen based on a first shooting parameter to obtain a shot image, where the first shooting parameter is a shooting parameter of the first template image.

According to a second aspect, an embodiment of this application provides a shooting apparatus including:

a receiving module configured to receive a first input to a first template image;

a display module configured to display a shooting preview screen in response to the first input; and a shooting module configured to: in a case that a second input is received, perform a shooting operation on an image in the shooting preview screen based on a first shooting parameter to obtain a shot image, where the first shooting parameter is a shooting parameter of the first template image.

According to a third aspect, an embodiment of this application provides an electronic device, where the electronic device includes a processor and a memory, the memory stores a program or instructions capable of running on the processor, and when the program or instructions are executed by the processor, the steps of the method according to the first aspect are implemented.

According to a fourth aspect, an embodiment of this application provides a readable storage medium, where the readable storage medium stores a program or instructions, and when the program or instructions are executed by a processor, the steps according to the first aspect are implemented.

According to a fifth aspect, an embodiment of this application provides a chip, where the chip includes a processor and a communications interface, the communications interface is coupled to the processor, the processor is configured to run a program or instructions, and when the program or instructions are executed by the processor, the steps according to the first aspect are implemented.

According to a sixth aspect, an embodiment of this application provides a computer program product, where the program product is stored in a storage medium, and the program product is executed by at least one processor so as to implement the method according to the first aspect.

According to a seventh aspect, an electronic device is provided and configured to execute the steps of the method according to the first aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that data used in this way is used interchangeably in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

The following describes in detail the image shooting method and apparatus and electronic device provided in the embodiments of this application through specific embodiments and application scenarios thereof with reference to the accompanying drawings.

Figure 1:
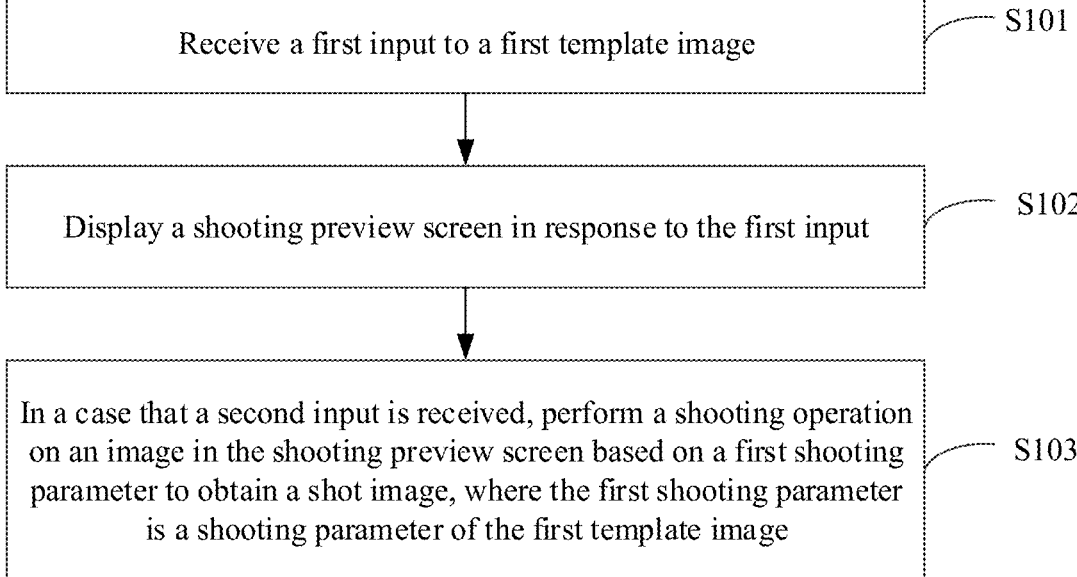
FIG. 1 is a first schematic flowchart of a shooting method according to an embodiment of this application.

Referring to FIG. 1, FIG. 1 is a flowchart of a shooting method according to an embodiment of this application. The shooting method includes the following steps:

Step S101: Receive a first input to a first template image.

Step S102: Display a shooting preview screen in response to the first input.

Step S103: In a case that a second input is received, perform a shooting operation on an image in the shooting preview screen based on a first shooting parameter to obtain a shot image, where the first shooting parameter is a shooting parameter of the first template image.

The foregoing first template image may be an image displayed in the shooting preview screen; or the first template image may be an image displayed at another location, for example, may be an image displayed on the desktop or in the photo album.

The first input may be a common touch input, for example, a tap input, a press input, or a double-tap input. In addition, the first input may act on any position of the first template image; or the first input may act on a specific position of the first template image.

It can be understood that the shooting method may be applied to various electronic devices with a shooting function. In a case that a camera application in the electronic device is not started, when the electronic device receives the first input to the first template image, the camera application can be started, the first shooting parameter of the first template image is obtained, and at the same time, a shooting parameter of the electronic device can be adjusted to the first shooting parameter. Furthermore, in a case that the camera application in the electronic device is started and the first template image is a template image displayed in the shooting preview screen, when the electronic device receives the first input to the first template image, the first shooting parameter of the first template image can be obtained, and at the same time, the shooting parameter of the electronic device can be adjusted to the first shooting parameter.

The first shooting parameter may include common shooting parameters such as shooting modes/lenses, exposure parameters, aperture parameters, filter types, and adjustment parameters.

The second input may be a common shooting input. For example, referring to FIG. 3, the second input may be a tap input to a shutter button 310, a specific shortcut shooting input, or the like.

Specifically, during the shooting process, a user may select the first template image from existing template images in the electronic device, and then perform the first input on the first template image. In this case, the shooting parameter of the camera in the electronic device is adjusted to the first shooting parameter. At the same time, the electronic device displays the shooting preview screen, allowing the user to adjust a shooting angle of an object to be shot. Then, the second input is input. When receiving the second input, the electronic device performs shooting based on the first shooting parameter, so as to obtain an image of a same style with the same shooting parameter as the first template image.

In this embodiment, the user merely needs to perform a first input on a first template image to enable the electronic device to perform shooting based on a shooting parameter of the first template image, so as to obtain an image of a same style that has the same shooting parameter as the first template image, thus simplifying the shooting process.

Optionally, template images in a template library are displayed on the shooting preview screen, where the template library includes the first template image; and after the displaying a shooting preview screen in response to the first input, the method further includes:

in a case that a third input to a second template image in the template library is received, updating a shooting parameter of an electronic device from the first shooting parameter to a second shooting parameter, where the second shooting parameter is a shooting parameter of the second template image; and in a case that a fourth input is received, performing a shooting operation on an image in the shooting preview screen based on the second shooting parameter to obtain a shot image.

The template library may be a template library that the user has downloaded from a specific location. Alternatively, the template library may be a template library constructed by the user based on images stored in the electronic device. The template library may include at least two template images, and the user may use the shooting method provided in this application to shoot an image of a same style corresponding to any template image in the template library.

Figure 3:
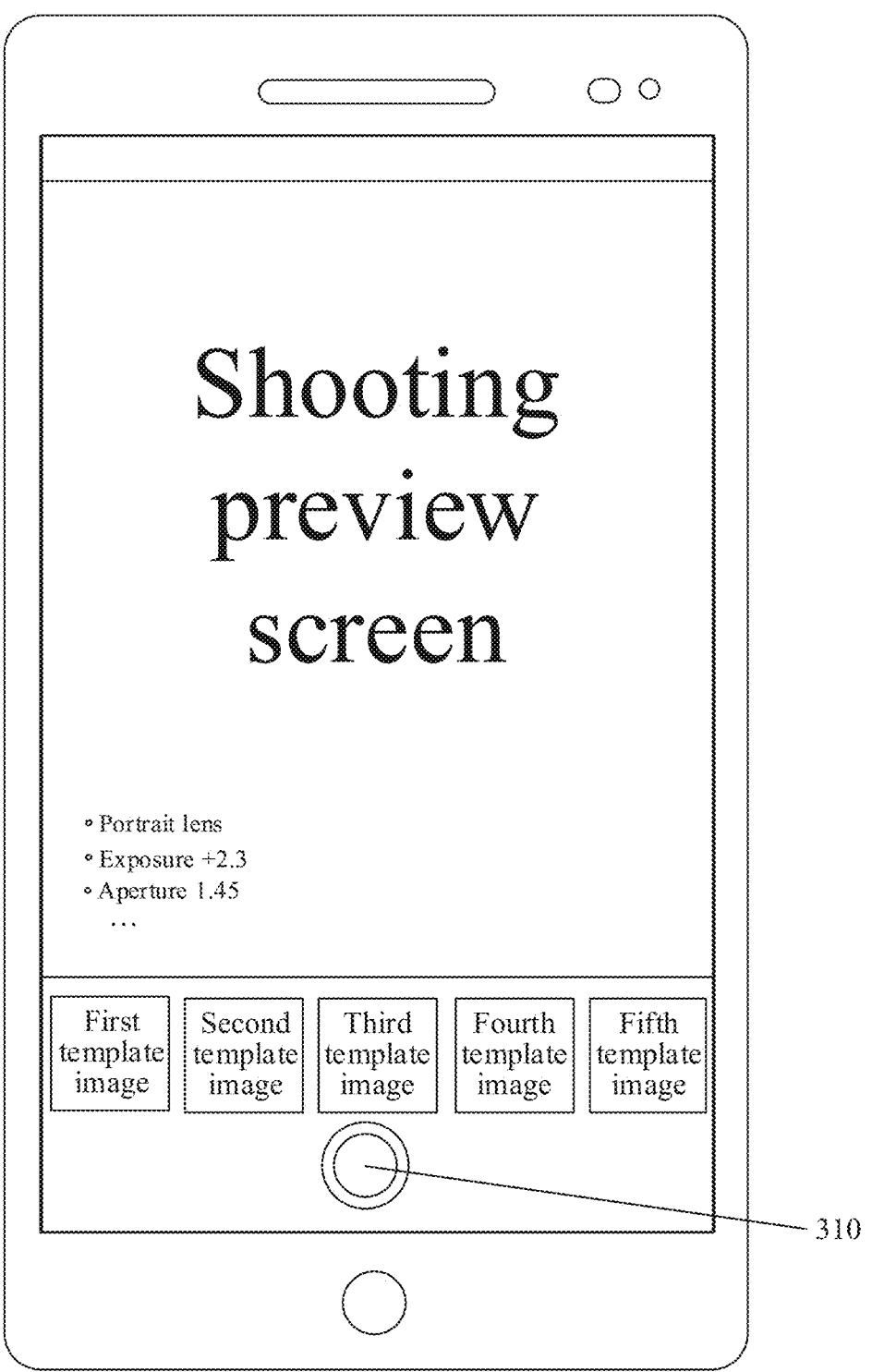
FIG. 3 is a schematic diagram of a shooting preview screen according to an embodiment of this application.
Figure 4:
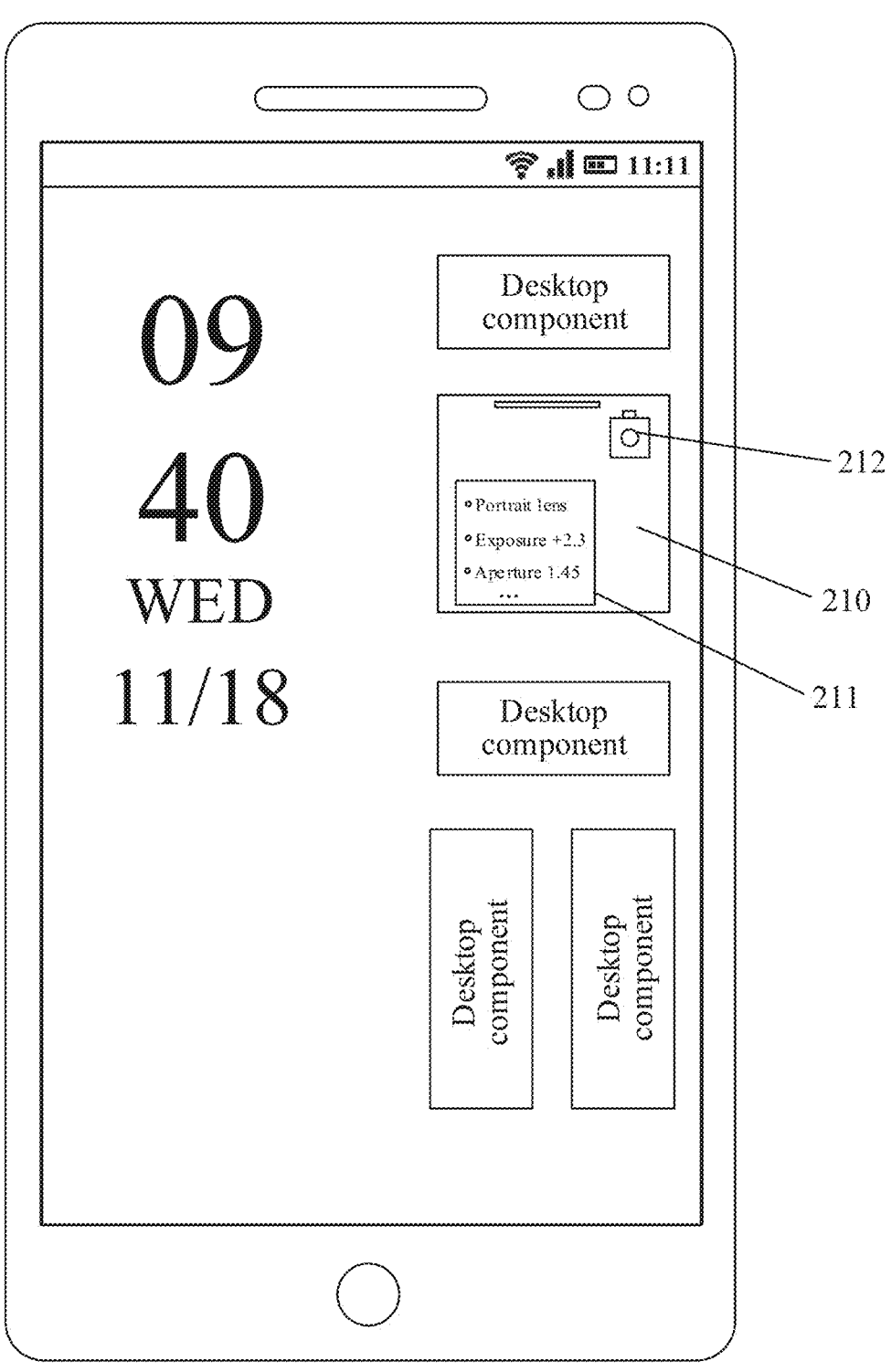
FIG. 4 is a second display status diagram of a desktop according to an embodiment of this application.

Referring to FIG. 3, the template images from the template library may be arranged and displayed in the shooting preview screen. The user can slide left or right in the display area of the template images to view all the template images in the template library. The third input may be a tap input from the user on the second template image displayed in the shooting preview screen. In a case of receiving the third input to the second template image in the template library, the electronic device can obtain the second shooting parameter of the second template image. At the same time, the shooting parameter of the electronic device can be updated from the first shooting parameter to the second shooting parameter.

The fourth input may be a common shooting input, for example, may be a tap input to the shutter button 310, or a specific shortcut shooting input.

In an embodiment of this application, the receiving a first input to a first template image may include: displaying a shooting preview screen, where template images from the template library are displayed on the shooting preview screen; and receiving the first input to the first template image displayed in the shooting preview screen. In other words, the first input and the third input are selection inputs to different template images displayed in the shooting preview screen.

Figure 2:
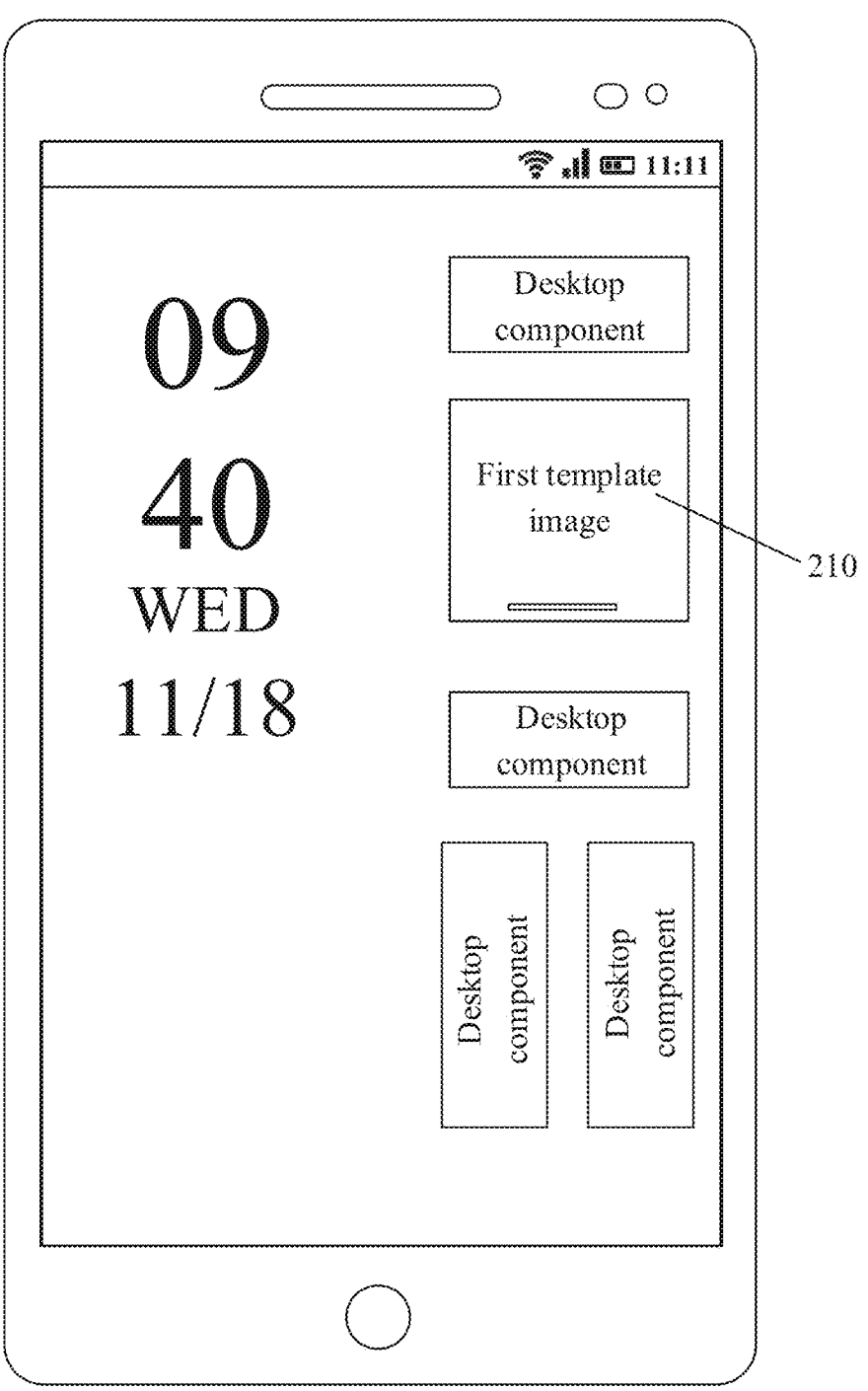
FIG. 2 is a first display status diagram of a desktop according to an embodiment of this application.

In another embodiment of this application, the receiving a first input to a first template image includes: displaying a target component 210 on a desktop of the electronic device, where the first template image is displayed in the target component 210; and receiving the first input to the target component 210; where the target component 210 may be a pre-configured desktop component. Referring to FIG. 2, the target component 210 may be displayed on the desktop of the electronic device, and the first template image may be displayed in the target component 210, where the first template image may be any template image from the template library. Furthermore, the first template image may alternatively be a specific template image from the template library. For example, the first template image may be a latest template image from the template library. In addition, the first template image may alternatively be the most frequently used template image from the template library by the user. In other words, the first shooting parameter is the shooting parameter, that the user has used most frequently, of the template image from the template library.

In this way, in the process of using the electronic device, the user can quickly start the camera application directly based on the first template image displayed on the desktop, and simultaneously adjust the shooting parameter of the electronic device to the first shooting parameter. After entering the shooting preview screen, the user can also perform shooting based on other template images displayed in the shooting preview screen, thus further improving the diversity of shooting.

In this embodiment, the template images from the template library are displayed on the shooting preview screen, so that the user can select other template images besides the first template image in the shooting preview screen and perform shooting based on a shooting parameter of the selected template image, thereby further enhancing the diversity of shooting.

Optionally, after the displaying a shooting preview screen in response to the first input, the method further includes:

in a case that a fifth input is received, performing shooting based on shooting parameters of at least two template images in the template library to obtain at least two shot images, where one shooting parameter corresponds to one shot image.

The fifth input may be a continuous shooting input, and the input action of the fifth input differs from the input action of the second input. For example, when the second input is a tap input to the shutter button 310, the fifth input may be a press input, double-tap input, or the like to the shutter button 310.

When receiving the fifth input, the electronic device can shoot a corresponding shot image based on the shooting parameter of each template image in the template library. The electronic device can also perform shooting based on the shooting parameters of only a part of the template images in the template library to obtain the at least two shot images. In this way, when the user is unsure which template image is more suitable for a current scene, the user can perform shooting based on the shooting parameters of different template images simultaneously to obtain at least two shot images. This allows the user to choose a satisfactory shot image from the at least two shot images, further simplifying the shooting process.

In this embodiment, at least two shot images are obtained based on the shooting parameters of at least two template images in the template library in response to the fifth input. In this way, when the user is unsure which template image is more suitable for the current scene, the user can perform shooting based on the shooting parameters of different template images simultaneously to obtain at least two shot images. This allows the user to choose a satisfactory shot image from the at least two shot images, further simplifying the shooting process.

Optionally, the template images from the template library are arranged and displayed in the shooting preview screen in a preset order, and the performing, in a case that a fifth input is received, shooting based on shooting parameters of at least two template images in the template library to obtain at least two shot images includes:

in a case that the fifth input is received, determining at least two template images in the template library in the preset order based on an action duration of the fifth input; and performing shooting in sequence to obtain at least two shot images based on shooting parameters of the at least two template images.

The preset order may refer to an order in which the template images are arranged in the template library. Specifically, the template images in the template library may be arranged in the order of generation of the template images. In addition, the user can also manually edit the order in which the template images are arranged in the template library.

In this embodiment, the fifth input may be a press input from the user to the shutter button 310, and the number of the at least two template images can be determined based on the action duration of the press input. Specifically, in a case that the fifth input from the user is received, first, the shot image corresponding to the first template image is shot. After the shooting is completed, if the fifth input has not ended, the shot image corresponding to a template image following the first template image is shot, until the user ends the fifth input. In this way, the at least two shot images can be obtained by shooting in sequence based on the preset order. In addition, the user can control the number of images obtained by shooting based on the action duration of the fifth input, which is conducive to improving the controllability of the number of images obtained by shooting by the user.

Optionally, after the performing shooting in sequence to obtain at least two shot images based on shooting parameters of the at least two template images, the method further includes:

updating the shooting parameter of the electronic device to a shooting parameter of a third template image, or updating the shooting parameter of the electronic device to a shooting parameter of a fourth template image; where the third template image is a template image corresponding to a last shot image among the at least two shot images, and the fourth template image is a template image following the third template image among the template images arranged in the preset order.

Specifically, after obtaining the at least two shot images by shooting, the user may check if there is a satisfactory shot image among the at least two shot images. If there is no image satisfactory to the user among the at least two shot images, that is, the shooting parameters of the at least two template images may not be optimal shooting parameters. In this case, the user may further perform shooting based on shooting parameters of other template images than the two template images.

In this embodiment, after at least two shot images are obtained by shooting in sequence based on the shooting parameters of the at least two template images, the shooting parameter of the electronic device is updated to the shooting parameter of the third template image, or the shooting parameter of the electronic device is updated to the shooting parameter of the fourth template image. This allows the user to continue shooting in the preset order following the shooting parameter of the last image obtained by shooting the last time, thereby avoiding the problem that the user shoots duplicate images based on the shooting parameters in the last shooting.

Optionally, the template library includes a fifth template image and a sixth template image displayed in the shooting preview screen, and after the displaying template images of a template library on the shooting preview screen, the method further includes:

in a case that a sixth input to the fifth template image is received, performing edit processing on the fifth template image; where the edit processing includes at least one of the following:

moving a position of the fifth template image on the shooting preview screen;

deleting the fifth template image from the shooting preview screen; and optimizing a shooting parameter of the fifth template image based on a shooting parameter of the sixth template image.

The fifth template image and the sixth template image may be any two template images in the template library. The sixth input may include a first sub-input, where the first sub-input may be a drag input to any template image in the shooting preview screen by the user. For example, the first sub-input may be a drag input to the fifth template image by the user, and the fifth template image can move along with the drag of the user to alter the arrangement position of the fifth template image. In this way, the user can change the arrangement position of any template image based on the first sub-input, so as to implement adjustment of the preset order of the template images displayed in the shooting preview screen.

For example, in an embodiment of this application, the edit processing includes: moving the position of the fifth template image in the shooting preview screen. After the performing edit processing on the fifth template image, the method further includes updating a shooting sequence of the template images displayed in the shooting preview screen from the preset order to a first target order. The performing, in a case that a fifth input is received, shooting based on shooting parameters of at least two template images in the template library to obtain at least two shot images includes: in a case that the fifth input is received, determining at least two template images in the template library in the first target order based on an action duration of the fifth input.

It can be understood that the first sub-input may only be used to update the preset order of the template images in the shooting preview screen to the first target order, that is, the arrangement order of the template images in the template library is still the preset order. That is, the first sub-input is only used to modify the arrangement order of the template images in a single shooting process, and the template images in the shooting preview screen will still be arranged in the preset order in the next shooting process. The single shooting process refers to a single continuous shooting process. Specifically, in this embodiment, the single shooting process is: performing shooting in sequence to obtain at least two shot images based on shooting parameters of the at least two template images in response to the fifth input. In addition, the first sub-input may also be used to update the arrangement order of the template images in the template library to the first target order. Therefore, in subsequent shooting processes, the template images in the shooting preview screen are arranged in the first target order.

In another embodiment of this application, the sixth input further includes a second sub-input, where the second sub-input may be used to delete the fifth template image from the shooting preview screen. For example, a template image displayed in the shooting preview screen includes a delete corner marker, and the second sub-input may be a tap input to the delete corner marker of the fifth template image by the user. The user may not need to perform shooting based on some template images in the continuous shooting process. Therefore, any template image displayed in the shooting preview screen may be removed based on the second sub-input. After the fifth template image is deleted, the arrangement order of the template images in the shooting preview screen is also updated accordingly.

For example, the edit processing includes: deleting the fifth template image from the shooting preview screen. After the performing edit processing on the fifth template image, the method further includes updating a shooting sequence of the template images displayed in the shooting preview screen from the preset order to a second target order. The performing, in a case that a fifth input is received, shooting based on shooting parameters of at least two template images in the template library to obtain at least two shot images includes: in a case that the fifth input is received, determining at least two template images in the template library in the second target order based on an action duration of the fifth input.

It can be understood that the second sub-input may only be used to remove the fifth template image from the shooting preview screen, and to update the preset order of the template images in the shooting preview screen to the second target order. In other words, the fifth template image in the template library will not be deleted, and at the same time, the arrangement order of the template images in the template library is still the preset order. That is, the second sub-input is only used to delete the fifth template image in a single shooting process, and to modify the arrangement order of the template images in the single shooting process. In the next shooting process, the fifth template image will be displayed again in the shooting preview screen, and the template images in the shooting preview screen will still be arranged in the preset order. In addition, the second sub-input may also be used to delete the fifth template image from the template library, and at the same time, to update the arrangement order of the template images in the template library to the second target order, so that in the subsequent shooting processes, the fifth template image will not be displayed in the shooting preview screen, and all the template images in the shooting preview screen will be arranged in the second target order.

In another embodiment of this application, the sixth input further includes a third sub-input, where the electronic device, upon receiving the third sub-input, can optimize the shooting parameter of the fifth template image based on the shooting parameter of the sixth template image. Specifically, the third sub-input may be an input that the user drags the sixth template image to overlap with the fifth template image. Upon receiving the third sub-input, the electronic device may superimpose the shooting parameter of the sixth template image onto the shooting parameter of the fifth template image in response to the third sub-input. Specifically, parameters of a same type may be superimposed, for example, the exposure parameters may be superimposed. Then, the shooting parameter obtained by superimposition is determined as the shooting parameter of the fifth template image. After optimization of the parameter of the fifth template image is completed, the fifth template image before parameter optimization may be removed from the shooting preview screen. In addition, after the parameter optimization of the fifth template image is completed, the fifth template image before parameter optimization may also be kept in the shooting preview screen. In addition, the sixth template image may be moved back to its original display position before the optimization, and the shooting parameter of the sixth template image remains unchanged.

In this embodiment, based on the sixth input, the user can change the arrangement order of the template images in the shooting preview screen, delete a template image in the shooting preview screen, and optimize the parameters of the template images in the shooting preview screen. This makes it convenient for the user to shoot according to shooting preferences of the user, thus improving the shooting diversity.

Optionally, the target component 210 may be displayed on the desktop of the electronic device, and before the receiving the first input to the target component 210, the method further includes:

in a case that a seventh template image is displayed in the target component 210, receiving a seventh input to the target component 210, where the seventh template image is any template image in a template library except the first template image; and updating the seventh template image to the first template image in response to the seventh input.

It can be understood that in a case that the target component 210 is displayed on the desktop of the electronic device, any template image from the template library can be displayed in the target component 210, and the user may change the template image displayed in the target component 210 based on the seventh input. For example, the seventh input may be a left or right sliding input to the target component 210. In this way, the user can slide left or right in the display area of the target component 210 to switch between the template images displayed in the target component 210. In addition, when the user performs the first input to any template image displayed in the target component 210, the camera application in the electronic device is started, and the shooting parameter of the electronic device is adjusted to the shooting parameter of the template image on which the first input acts.

Specifically, all template images from the template library can be invoked in the target component 210 for display, and only one template image from the template library is displayed at a time in the target component 210. The display order of the template images in the target component 210 may be the preset order. That is, following the sliding input of the user in the target component 210, the template images in the template library are displayed in sequence in the target component 210 in the preset order. For example, the first template image and the seventh template image may be two adjacent template images. In a case that the electronic device displays the seventh template image, upon receiving the seventh input, the electronic device may update the seventh template image to the first template image.

In this embodiment, the user can change the template image displayed in the target component 210 based on the seventh input. Therefore, when the user needs to perform shooting based on a template image, the user can first select, based on the seventh input, the first template image to be used in the target component 210 displayed on the desktop, and then perform the first input on the first template image to perform shooting based on the shooting parameter of the first template image. This is conducive to simplifying the shooting process further.

Optionally, the target component 210 further includes at least one of the first shooting parameter and a preset shooting control 212, and the receiving the first input to the target component 210 includes at least one of the following:

receiving the first input to the first template image;
receiving the first input to the preset shooting control 212; and
receiving the first input to the first shooting parameter.

Figure 5:
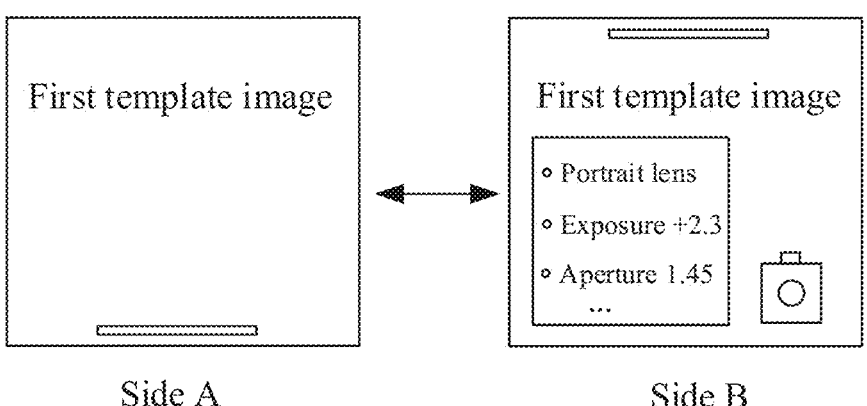
FIG. 5 is a schematic diagram of side A and side B of a target component according to an embodiment of this application.
Figure 6:
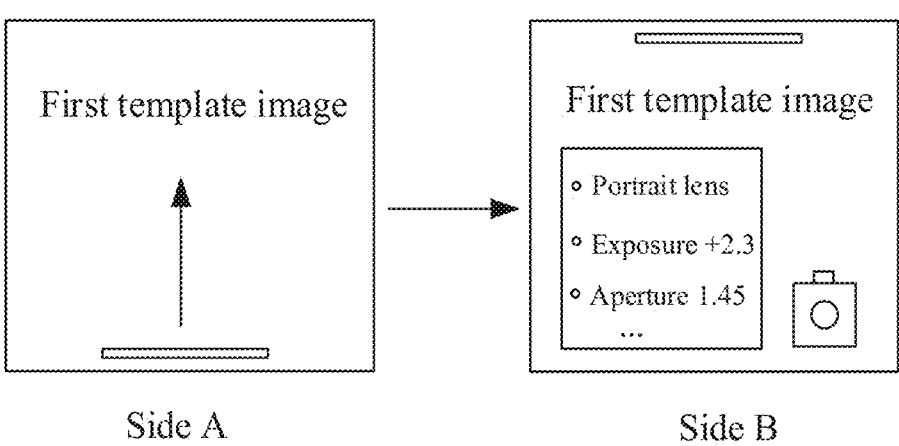
FIG. 6 is a schematic diagram of a target component switching from side A to side B according to an embodiment of this application.
Figure 7:
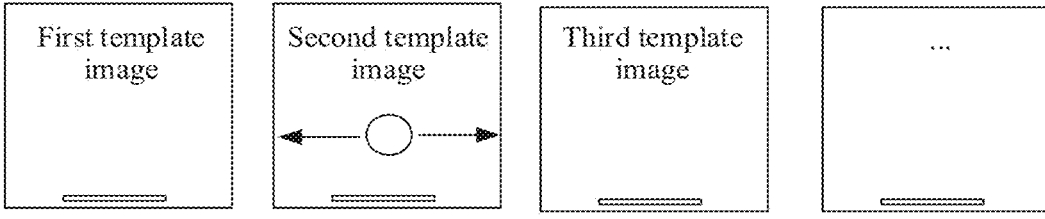
FIG. 7 is a schematic diagram of switching template images in a target component according to an embodiment of this application.

Specifically, while displaying the first template image, the target component 210 may also display the preset shooting control 212 and the first shooting parameter of the first template image. The preset shooting control 212 and the first shooting parameter may be displayed synchronously with the first template image. Alternatively, the preset shooting control 212 and the first shooting parameter may be displayed based on an eighth input of the user. For example, referring to FIG. 4 to FIG. 7, the target component 210 may include side A and side B. The user can implement switching between side A and side B by sliding up and down in the internal area of the target component 210. The first template image is displayed on side A, and the preset shooting control 212 and the first shooting parameter 211 are displayed on side B. In this way, the user can view the template image and the shooting parameter of the template image by performing the eighth input to the target component 210 displayed on the electronic device. For example, referring to FIG. 6, in a case that side A is displayed in the target component 210, when the user performs an upward sliding input to the target component 210, the display content in the target component 210 can be switched to side B. In addition, referring to FIG. 7, in a case that side A is displayed in the target component 210, the user can switch between different template images by sliding left or right in the target component 210. Referring to FIG. 5 and FIG. 6, in an embodiment of this application, the first template image may also be displayed on side B. In addition, in a case that side B is displayed in the target component 210, the user can switch between different template images by sliding left or right in the target component 210.

In addition, in a case that the ninth template image from the template library is displayed in the shooting preview screen, the shooting parameter of the ninth template image can be displayed when the eighth input to the ninth template image is received. The ninth template image may be any template image in the template library, and the eighth input may be an upward or downward sliding input to the ninth template image. In this way, by performing the eighth input to the ninth template image displayed in the shooting preview screen, the user can view the template image and the shooting parameter of the template image.

In this embodiment, the user can perform the first input through any one of the first template image, the preset shooting control 212, and the first shooting parameter to start the camera application and adjust the shooting parameter of the electronic device to the first shooting parameter.

Optionally, the method further includes:

in a case that a ninth input to a first image displayed in an electronic device is received, obtaining a shooting parameter of the first image; and generating an eighth template image in a template library based on the first image and the shooting parameter of the first image.

The first image may be any image stored in the electronic device, for example, an image obtained by the user through shooting based on the electronic device; an image obtained by the user from the Internet; or an image obtained by the user through social software. The user can generate a template image based on an image with high image quality in the electronic device and add the template image to the template library, so as to facilitate subsequent shooting of an image with a same style based on the generated template image. Taking the generation of the eighth template image based on the first image as an example, the generation process of the template image is further explained below.

Specifically, when the first image is an image obtained by shooting using the electronic device, the electronic device can record the shooting parameter of the first image during the shooting process of the first image. Therefore, when receiving the ninth input to the first image by the user, the electronic device can directly acquire the shooting parameter of the first image and store the first image in association with the shooting parameter of the first image in the template library to create the eighth template image.

In addition, when the first image is not an image obtained directly by shooting using the electronic device, in a case of receiving the ninth input to the first image, the electronic device can recognize the first image through image recognition technology to obtain the shooting parameter of the first image. Then, the first image and the shooting parameter of the first image are stored in association in the template library to form the eighth template image.

The ninth input may be a specific touch input by the user to the first image, for example, dragging of the first image to a specific position, or a press input.

In this embodiment, based on the ninth input, the user can add an image with high shooting quality in the electronic device to the template library, so that the user can set any image as a template image, which makes it convenient for the user to shoot various styles of images.

Figure 8:
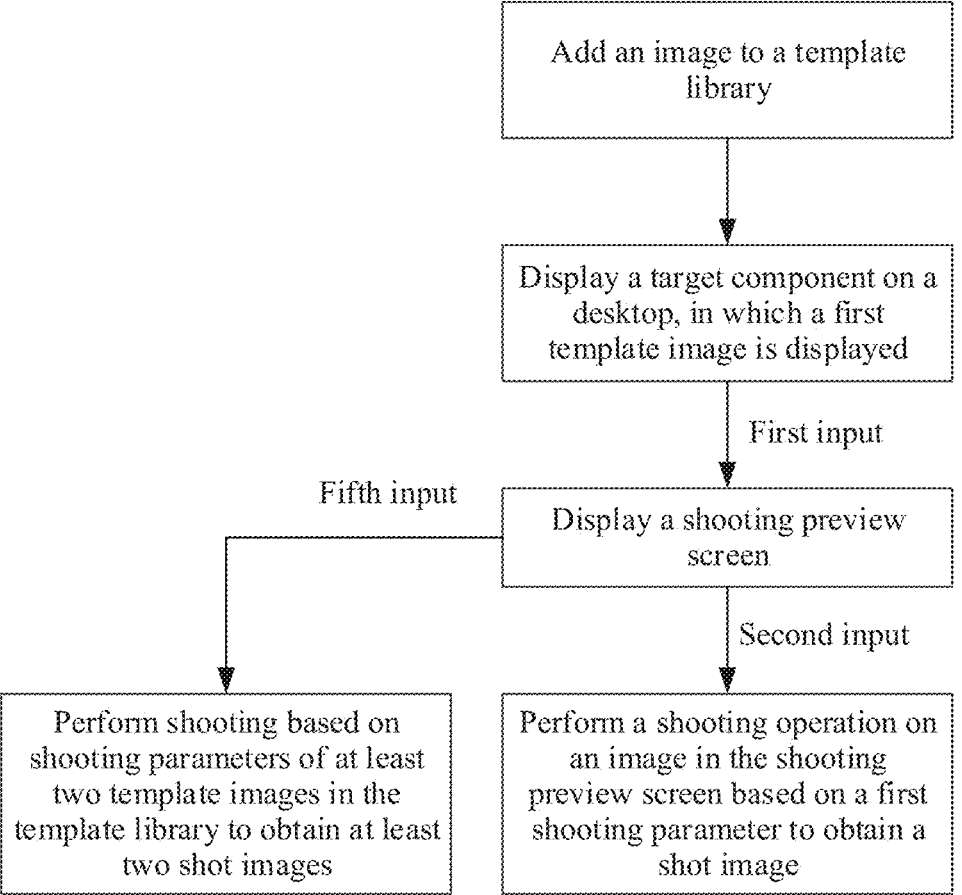
FIG. 8 is a second schematic flowchart of a shooting method according to an embodiment of this application.

Referring to FIG. 8, FIG. 8 shows a shooting method according to an embodiment of this application, where the shooting method includes the following steps: adding an image to the template library; displaying a target component 210 on a desktop, where an image in the electronic device can be added to the template library based on the ninth input, and the first template image can be displayed in the target component 210; in a case that the first input to the first template image is received, displaying the shooting preview screen; in a case that a tap input (that is, a second input) to a shutter is received, performing a shooting operation on the image in the shooting preview screen based on the first shooting parameter to obtain the shot image; and in a case that a long-press input (that is, a fifth input) to the shutter is received, shooting based on shooting parameters of at least two template images in the template library to obtain at least two shot images, where one shooting parameter corresponds to one shot image.

Figure 9:
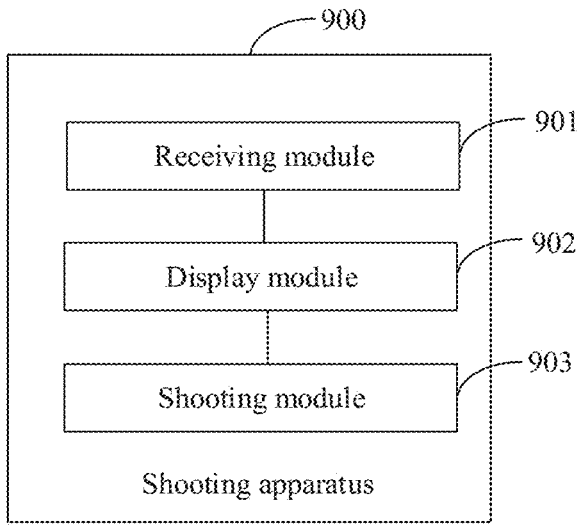
FIG. 9 is a schematic structural diagram of a shooting apparatus according to an embodiment of this application.

Referring to FIG. 9, FIG. 9 is a schematic structural diagram of a shooting apparatus 900 according to an embodiment of this application, where the shooting apparatus 900 includes:

a receiving module 901 configured to receive a first input to a first template image;

a display module 902 configured to display a shooting preview screen in response to the first input; and a shooting module 903 configured to: in a case that a second input is received, perform a shooting operation on an image in the shooting preview screen based on a first shooting parameter to obtain a shot image, where the first shooting parameter is a shooting parameter of the first template image.

Optionally, template images in a template library are displayed on the shooting preview screen; and the apparatus further includes:

a first updating module configured to: in a case that a third input to a second template image in the template library is received, update a shooting parameter of an electronic device from the first shooting parameter to a second shooting parameter, where the second shooting parameter is a shooting parameter of the second template image; and the shooting module 903 is further configured to: in a case that a fourth input is received, perform a shooting operation on an image in the shooting preview screen based on the second shooting parameter to obtain a shot image.

The shooting module 903 is further configured to: in a case that a fifth input is received, perform shooting based on shooting parameters of at least two template images in the template library to obtain at least two shot images, where one shooting parameter corresponds to one shot image.

Optionally, the template images from the template library are arranged and displayed in the shooting preview screen in a preset order, and the shooting module 903 includes:

a determining sub-module configured to: in a case that the fifth input is received, determine at least two template images in the template library in the preset order based on an action duration of the fifth input; and a shooting sub-module configured to perform shooting in sequence to obtain at least two shot images based on shooting parameters of the at least two template images.

The first updating module is further configured to: after at least two shot images are obtained by shooting in sequence based on the shooting parameters of the at least two template images, update the shooting parameter of the electronic device to the shooting parameter of the third template image, or update the shooting parameter of the electronic device to the shooting parameter of the fourth template image, where the third template image is a template image corresponding to a last shot image among the at least two shot images, and the fourth template image is a template image following the third template image among the template images arranged in the preset order.

Optionally, the template library includes a fifth template image and a sixth template image displayed in the shooting preview screen; and the apparatus further includes:

an editing module configured to: in a case that a sixth input to the fifth template image is received, perform edit processing on the fifth template image;

where the edit processing includes at least one of the following:

moving a position of the fifth template image on the shooting preview screen;

deleting the fifth template image from the shooting preview screen; and optimizing a shooting parameter of the fifth template image based on a shooting parameter of the sixth template image.

Optionally, the display module 902 is configured to display a target component 210 on a desktop of an electronic device, where the first template image is displayed in the target component 210; and the receiving module 901 is configured to receive the first input to the target component 210.

Optionally, the receiving module 901 is further configured to: in a case that a seventh template image is displayed in the target component 210, receive a seventh input to the target component 210, where the seventh template image is any template image in a template library except the first template image; and the apparatus further includes:

a second updating module configured to: update the seventh template image to the first template image in response to the seventh input.

Optionally, the target component 210 further includes at least one of the first shooting parameter and a preset shooting control 212, and the receiving the first input to the target component 210 includes at least one of the following:

receiving the first input to the first template image;

receiving the first input to the preset shooting control 212; and receiving the first input to the first shooting parameter.

Optionally, the display module 902 is further configured to: in a case that an eighth input to the target component 210 is received, display at least one of the first shooting parameter and the preset shooting control 212.

Optionally, the apparatus further includes:

an obtaining module configured to: in a case that a ninth input to a first image displayed in an electronic device is received, obtain a shooting parameter of the first image; and a generating module configured to generate an eighth template image in a template library based on the first image and the shooting parameter of the first image.

In this embodiment, a user merely needs to perform a first input on a first template image to enable the electronic device to perform shooting based on a shooting parameter of the first template image, so as to obtain an image of a same style that has the same shooting parameter as the first template image, thus simplifying the shooting process.

The shooting apparatus 900 in this embodiment of this application may be an electronic device, or may be a component in the electronic device, such as an integrated circuit or a chip. The electronic device may be a terminal or any other device besides the terminal. For example, the electronic device may be a mobile phone, a tablet computer, a notebook computer, a palmtop computer, a vehicle-mounted electronic device, a mobile Internet device (MID), an augmented reality (AR)/virtual reality (VR) device, a robot, a wearable device, an ultra-mobile personal computer (UMPC), a netbook, or a personal digital assistant (PDA), and may also be a server, a network attached storage (NAS), a personal computer (PC), a television (TV), a teller machine, a self-service machine, or the like. This is not specifically limited in the embodiments of this application.

The shooting apparatus 900 in this embodiment of this application may be an apparatus having an operating system. The operating system may be an android operating system, an iOS operating system, or another possible operating system. This is not specifically limited in an embodiment of this application.

The shooting apparatus provided in this embodiment of this application can implement the processes implemented in the method embodiment in FIG. 1 or FIG. 8. To avoid repetition, details are not described herein again.

Figure 10:
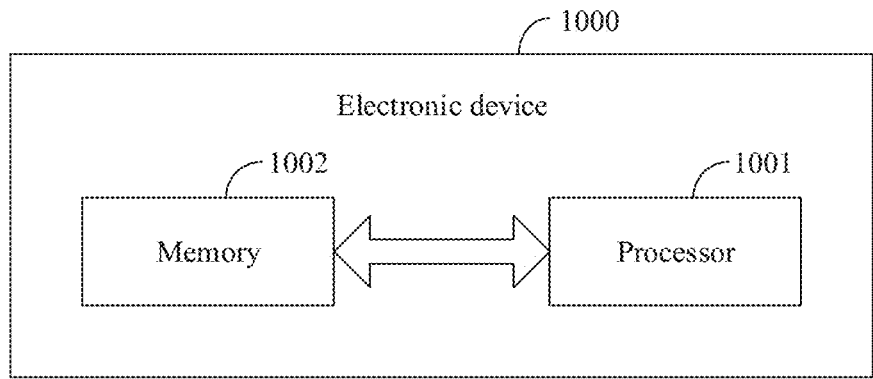
FIG. 10 is a schematic structural diagram of an electronic device according to an embodiment of this application.

Optionally, as shown in FIG. 10, an embodiment of this application further provides an electronic device 1000, including a processor 1001, a memory 1002, and a program or instructions stored in the memory 1002 and capable of running on the processor 1001, where when the program or instructions are executed by the processor 1001, the processes of the foregoing shooting method embodiment are implemented, with the same technical effects achieved. To avoid repetition, details are not further described herein.

It should be noted that the shooting apparatus in the embodiments of this application includes the foregoing mobile electronic device and non-mobile electronic device.

Figure 11:
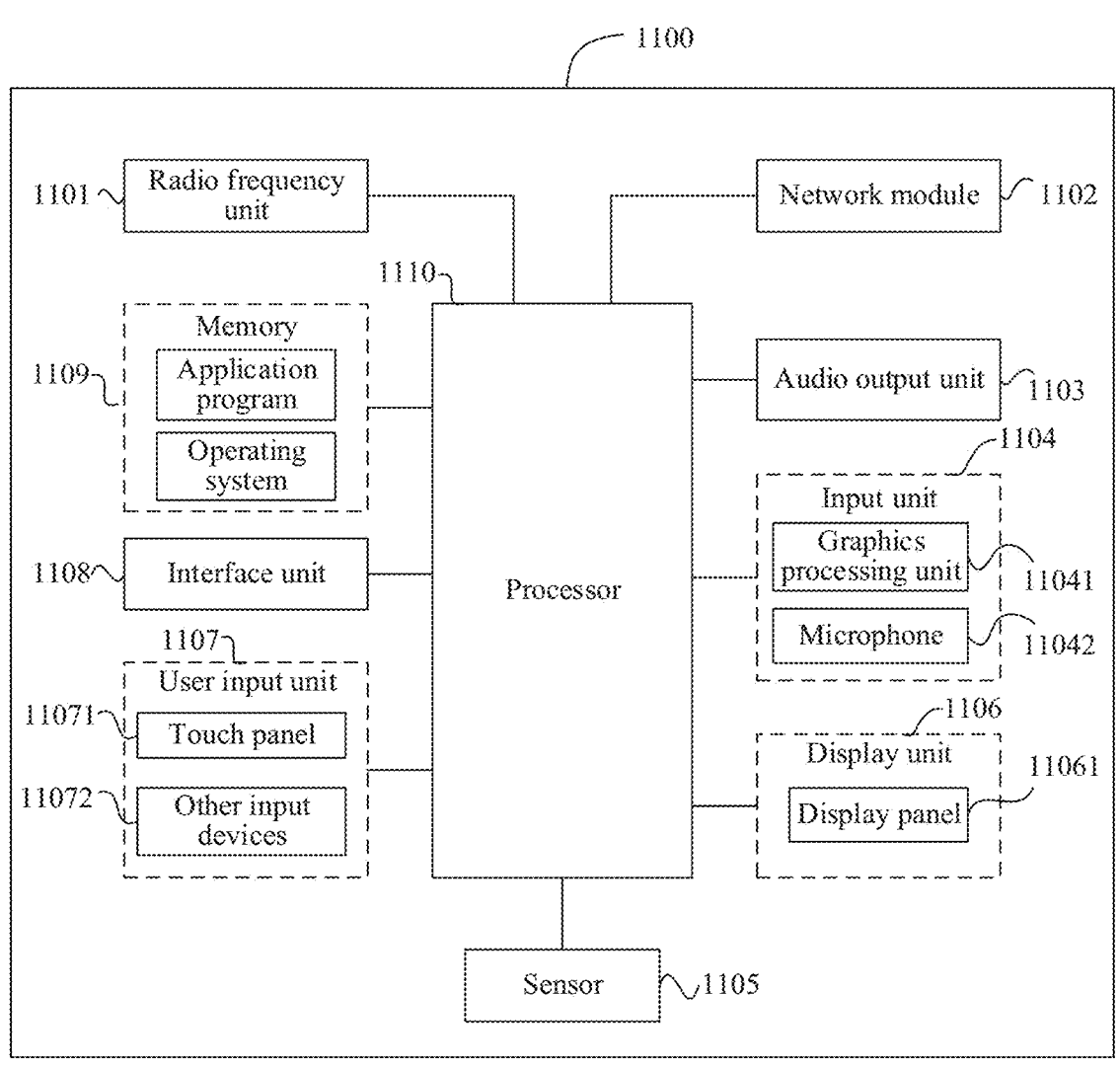
FIG. 11 is a schematic diagram of a hardware structure of an electronic device according to an embodiment of this application.

FIG. 11 is a schematic diagram of a hardware structure of an electronic device implementing the embodiments of this application.

The electronic device 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

The user input unit 1107 is configured to receive a first input to a first template image.

The display unit 1106 is configured to display a shooting preview screen in response to the first input.

The sensor 1105 is configured to: in a case that a second input is received, perform a shooting operation on an image in the shooting preview screen based on a first shooting parameter to obtain a shot image, where the first shooting parameter is a shooting parameter of the first template image.

Optionally, the processor 1110 is configured to: in a case that a third input to a second template image in the template library is received, update a shooting parameter of an electronic device from the first shooting parameter to a second shooting parameter, where the second shooting parameter is a shooting parameter of the second template image; and the sensor 1105 is configured to: in a case that a fourth input is received, perform a shooting operation on an image in the shooting preview screen based on the second shooting parameter to obtain a shot image.

Optionally, the sensor 1105 is configured to: in a case that a fifth input is received, perform shooting based on shooting parameters of at least two template images in the template library to obtain at least two shot images, where one shooting parameter corresponds to one shot image.

Optionally, the processor 1110 is configured to: in a case that the fifth input is received, determine at least two template images in the template library in the preset order based on an action duration of the fifth input; and the sensor 1105 is configured to perform shooting in sequence to obtain at least two shot images based on shooting parameters of the at least two template images.

Optionally, the processor 1110 is configured to update the shooting parameter of the electronic device to a shooting parameter of a third template image, or update the shooting parameter of the electronic device to a shooting parameter of a fourth template image; where the third template image is a template image corresponding to a last shot image among the at least two shot images, and the fourth template image is a template image following the third template image among the template images arranged in the preset order.

Optionally, the processor 1110 is configured to: in a case that a sixth input to the fifth template image is received, perform edit processing on the fifth template image; where the edit processing includes at least one of the following:

moving a position of the fifth template image on the shooting preview screen;

deleting the fifth template image from the shooting preview screen; and optimizing a shooting parameter of the fifth template image based on a shooting parameter of the sixth template image.

Optionally, the display unit 1106 is configured to display a target component 210 on a desktop of an electronic device, where the first template image is displayed in the target component 210; and the user input unit 1107 is configured to receive the first input to the target component 210.

Optionally, the user input unit 1107 is configured to: in a case that a seventh template image is displayed in the target component 210, receive a seventh input to the target component 210, where the seventh template image is any template image in a template library except the first template image; and the processor 1110 is configured to update the seventh template image to the first template image in response to the seventh input.

Optionally, the target component 210 further includes at least one of the first shooting parameter and a preset shooting control 212, and the receiving the first input to the target component 210 includes at least one of the following:

receiving the first input to the first template image;

receiving the first input to the preset shooting control 212; and receiving the first input to the first shooting parameter.

Optionally, the display unit 1106 is further configured to: in a case that an eighth input to the target component 210 is received, display at least one of the first shooting parameter and the preset shooting control 212.

Optionally, the processor 1110 is configured to: in a case that a ninth input to a first image displayed in an electronic device is received, obtain a shooting parameter of the first image; and the processor 1110 is configured to generate an eighth template image in a template library based on the first image and the shooting parameter of the first image.

Those skilled in the art can understand that the electronic device 1100 may further include a power supply (for example, a battery) that supplies power to various components. The power supply may be logically connected to the processor 1110 through a power management system, so that functions such as charge and discharge management and power consumption management are implemented by using the power management system. The structure of the electronic device shown in FIG. 11 does not constitute a limitation on the electronic device. The electronic device may include more or fewer components than shown in the figure, or some components may be combined, or there may be a different component layout. Details are not described herein.

It should be understood that the input unit 1104 may include a graphics processing unit (GPU) 11041 and a microphone 11042. The graphics processing unit 11041 processes image data of still pictures or videos that are obtained by an image capture apparatus (for example, a camera) in an image or video capture mode. The display unit 1106 may include a display panel 11061. The display panel 11061 may be configured in a form of a liquid crystal display, an organic light-emitting diode display, or the like. The user input unit 1107 includes at least one of a touch panel 11071 and other input devices 11072. The touch panel 11071 is also referred to as a touchscreen. The touch panel 11071 may include two parts: a touch detection apparatus and a touch controller. Specifically, the other input devices 11072 may include but are not limited to a physical keyboard, a function button (for example, volume control button or on/off button), a trackball, a mouse, and a joystick. Details are not described herein.

The memory 1109 may be configured to store a software program and various data. The memory 1109 may include a first storage area for storing programs or instructions and a second storage area for storing data. The first storage area may store an operating system, an application program or instructions required by at least one function (for example, a sound playback function or an image playback function), and the like. Additionally, the memory 1109 may be a volatile memory or a non-volatile memory, or the memory 1109 may include both a volatile memory and a non-volatile memory. The non-volatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synch link DRAM, SLDRAM), and a direct rambus random access memory (Direct Rambus RAM, DRRAM). The memory 1109 of the embodiments of this application includes but is not limited to these and any other applicable types of memories.

The processor 1110 may include one or more processing units. Optionally, the processor 1110 may integrate an application processor and a modem processor. The application processor primarily processes operations involving an operating system, user interface, application program, or the like. The modem processor primarily processes radio communication signals, for example, being a baseband processor. It can be understood that the modem processor may alternatively be not integrated in the processor 1110.

An embodiment of this application further provides a readable storage medium, where the readable storage medium stores a program or instructions, and when the program or instructions are executed by a processor, the processes of the foregoing shooting method embodiments are implemented, with the same technical effects achieved. To avoid repetition, details are not described herein again.

The processor is the processor in the electronic device in the foregoing embodiments. The readable storage medium includes a computer-readable storage medium such as a computer read-only memory ROM, a random access memory RAM, a magnetic disk, or an optical disc.

Another embodiment of this application provides a chip, where the chip includes a processor and a communications interface, the communications interface is coupled to the processor, and the processor is configured to run a program or instructions to implement the processes of the foregoing shooting method embodiments, with the same technical effects achieved. To avoid repetition, details are not described herein again.

It should be understood that the chip in the embodiments of this application may also be referred to as a system-level chip, a system chip, a chip system, a system on chip, or the like.

An embodiment of this application provides a computer program product, where the program product is stored in a readable storage medium, and the program product is executed by at least one processor to implement the processes of the foregoing shooting method embodiments, with the same technical effects achieved. To avoid repetition, details are not described herein again.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the method and apparatus in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

Based on the above description of embodiments, persons skilled in the art can clearly understand that the method in the foregoing embodiments can be implemented through software on a necessary hardware platform or certainly through hardware only, but in many cases, the former is the more preferred implementation. Based on such an understanding, the technical solutions of this application essentially, or the part contributing to the prior art may be implemented in a form of a computer software product. The computer software product is stored in a storage medium (for example, a ROM/RAM, a magnetic disk, or an optical disc), and includes several instructions for instructing a terminal (which may be a mobile phone, a computer, a server, a network device, or the like) to perform the method described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other forms without departing from the principle of this application and the protection scope of the claims, and all such forms fall within the protection scope of this application.

What is claimed is:

1. A shooting method, comprising:

receiving a first input to a first template image;

displaying a shooting preview screen in response to the first input; and in a case that a second input is received, performing a shooting operation on an image in the shooting preview screen based on a first shooting parameter to obtain a shot image, wherein the first shooting parameter is a shooting parameter of the first template image;

wherein template images in a template library are displayed on the shooting preview screen, wherein the template library comprises the first template image; and after the displaying a shooting preview screen in response to the first input, the method further comprises:

in a case that a third input to a second template image in the template library is received updating a shooting parameter of an electronic device from the first shooting parameter to a second shooting parameter, wherein the second shooting parameter is a shooting parameter of the second template image; and in a case that a fourth input is received, performing a shooting operation on an image in the shooting preview screen based on the second shooting parameter to obtain a shot image.

2. The method according to claim 1, wherein after the displaying a shooting preview screen in response to the first input, the method further comprises:

in a case that a fifth input is received, performing shooting based on shooting parameters of at least two template images in the template library to obtain at least two shot images, wherein one shooting parameter corresponds to one shot image.

3. The method according to claim 2, wherein the template images from the template library are arranged and displayed in the shooting preview screen in a preset order, and the performing, in a case that a fifth input is received, shooting based on shooting parameters of at least two template images in the template library to obtain at least two shot images comprises:

in a case that the fifth input is received, determining at least two template images in the template library in the preset order based on an action duration of the fifth input; and performing shooting in sequence to obtain at least two shot images based on shooting parameters of the at least two template images.

4. The method according to claim 3, wherein after the performing shooting in sequence to obtain at least two shot images based on shooting parameters of the at least two template images, the method further comprises:

updating the shooting parameter of the electronic device to a shooting parameter of a third template image, or updating the shooting parameter of the electronic device to a shooting parameter of a fourth template image; wherein the third template image is a template image corresponding to a last shot image among the at least two shot images, and the fourth template image is a template image following the third template image among the template images arranged in the preset order.

5. The method according to claim 1, wherein the template library comprises a fifth template image and a sixth template image displayed in the shooting preview screen, and after the template images in the template library are displayed on the shooting preview screen, the method further comprises:

in a case that a sixth input to the fifth template image is received, performing edit processing on the fifth template image; wherein the edit processing comprises at least one of the following:

moving a position of the fifth template image on the shooting preview screen;

deleting the fifth template image from the shooting preview screen; and optimizing a shooting parameter of the fifth template image based on a shooting parameter of the sixth template image.

6. The method according to claim 1, wherein the receiving a first input to a first template image comprises:

displaying a target component on a desktop of an electronic device, wherein the first template image is displayed in the target component; and receiving the first input to the target component.

7. The method according to claim 6, wherein before the receiving the first input to the target component, the method further comprises:

in a case that a seventh template image is displayed in the target component, receiving a seventh input to the target component, wherein the seventh template image is any template image in a template library except the first template image; and updating the seventh template image to the first template image in response to the seventh input.

8. The method according to claim 6, wherein the target component further comprises at least one of the first shooting parameter and a preset shooting control, and the receiving the first input to the target component comprises at least one of the following:

receiving the first input to the first template image;

receiving the first input to the preset shooting control; and receiving the first input to the first shooting parameter.

9. The method according to claim 8, wherein before the receiving the first input to the target component, the method further comprises:

in a case that an eighth input to the target component is received, displaying at least one of the first shooting parameter and the preset shooting control.

10. The method according to claim 1, wherein the method further comprises:

in a case that a ninth input to a first image displayed in an electronic device is received, obtaining a shooting parameter of the first image; and generating an eighth template image in a template library based on the first image and the shooting parameter of the first image.

11. A shooting apparatus, comprising:

a receiving module configured to receive a first input to a first template image;

a display module configured to display a shooting preview screen in response to the first input; and a shooting module configured to: in a case that a second input is received, perform a shooting operation on an image in the shooting preview screen based on a first shooting parameter to obtain a shot image, wherein the first shooting parameter is a shooting parameter of the first template image;

wherein template images in a template library are displayed on the shooting preview screen, and the apparatus further comprises:

a first updating module configured to: in a case that a third input to a second template image in the template library is received, update a shooting parameter of an electronic device from the first shooting parameter to a second shooting parameter, wherein the second shooting parameter is a shooting parameter of the second template image; and the shooting module is further configured to: in a case that a fourth input is received, perform a shooting operation on an image in the shooting preview screen based on the second shooting parameter to obtain a shot image.

12. The apparatus according to claim 11, wherein the shooting module is further configured to: in a case that a fifth input is received, perform shooting based on shooting parameters of at least two template images in the template library to obtain at least two shot images, wherein one shooting parameter corresponds to one shot image.

13. The apparatus according to claim 12, wherein the template images from the template library are arranged and displayed in the shooting preview screen in a preset order, and the shooting module comprises:

a determining sub-module configured to: in a case that the fifth input is received, determine at least two template images in the template library in the preset order based on an action duration of the fifth input; and a shooting sub-module configured to perform shooting in sequence to obtain at least two shot images based on shooting parameters of the at least two template images.

14. The apparatus according to claim 13, wherein the first updating module is further configured to: after the performing shooting in sequence to obtain at least two shot images based on shooting parameters of the at least two template images, update the shooting parameter of the electronic device to a shooting parameter of a third template image, or update the shooting parameter of the electronic device to a shooting parameter of a fourth template image; wherein the third template image is a template image corresponding to a last shot image among the at least two shot images, and the fourth template image is a template image following the third template image among the template images arranged in the preset order.

15. The apparatus according to claim 11, wherein the template library comprises a fifth template image and a sixth template image displayed in the shooting preview screen; and the apparatus further comprises:

an editing module configured to: in a case that a sixth input to the fifth template image is received, perform edit processing on the fifth template image; where the edit processing comprises at least one of the following:

moving a position of the fifth template image on the shooting preview screen;

deleting the fifth template image from the shooting preview screen; and optimizing a shooting parameter of the fifth template image based on a shooting parameter of the sixth template image.

16. The apparatus according to claim 11, wherein the display module is configured to display a target component on a desktop of an electronic device, wherein the first template image is displayed in the target component; and the receiving module is configured to receive the first input to the target component;

or, wherein the apparatus further comprises:

an obtaining module configured to: in a case that a ninth input to a first image displayed in an electronic device is received, obtain a shooting parameter of the first image; and a generating module configured to generate an eighth template image in a template library based on the first image and the shooting parameter of the first image.

17. The apparatus according to claim 16, wherein the receiving module is further configured to: in a case that a seventh template image is displayed in the target component, receive a seventh input to the target component, wherein the seventh template image is any template image in a template library except the first template image; and the apparatus further comprises:

a second updating module configured to: update the seventh template image to the first template image in response to the seventh input;

or, wherein the target component further comprises at least one of the first shooting parameter and a preset shooting control, and the receiving the first input to the target component comprises at least one of the following:

receiving the first input to the first template image;

receiving the first input to the preset shooting control; and receiving the first input to the first shooting parameter;

wherein the display module is further configured to: in a case that an eighth input to the target component is received, display at least one of the first shooting parameter and the preset shooting control.

18. An electronic device, comprising a processor and a memory, wherein the memory stores a program or instructions capable of running on the processor, and the program or instructions, when executed by the processor, causes the processor to perform:

receiving a first input to a first template image;

displaying a shooting preview screen in response to the first input; and in a case that a second input is received, performing a shooting operation on an image in the shooting preview screen based on a first shooting parameter to obtain a shot image, wherein the first shooting parameter is a shooting parameter of the first template image;

wherein template images in a template library are displayed on the shooting preview screen, and the program or instructions, when executed by the processor, causes the processor to perform;

in a case that a third input to a second template image in the template library is received, updating a shooting parameter of an electronic device from the first shooting parameter to a second shooting parameter, wherein the second shooting parameter is a shooting parameter of the second template image; and in a case that a fourth input is received, performing a shooting operation on an image in the shooting preview screen based on the second shooting parameter to obtain a shot image.

<div align="center">* * * * *</div>